United States Patent
Recker (10) Patent No.: US 9,424,843 B2
(45) Date of Patent: Aug. 23, 2016

(54) METHODS AND APPARATUS FOR SIGNAL SHARING TO IMPROVE SPEECH UNDERSTANDING

(71) Applicant: Starkey Laboratories, Inc., Eden Prairie, MN (US)

(72) Inventor: Karrie LaRae Recker, Edina, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 104 days.

(21) Appl. No.: 14/035,154

(22) Filed: Sep. 24, 2013

(65) Prior Publication Data

US 2015/0088501 A1 Mar. 26, 2015

(51) Int. Cl.
| | |
|---|---|
| *G10L 21/06* | (2013.01) |
| *G10L 15/26* | (2006.01) |
| *G10L 21/10* | (2013.01) |
| *H04W 8/18* | (2009.01) |
| *H04W 8/20* | (2009.01) |
| *H04W 92/16* | (2009.01) |
| *H04W 4/06* | (2009.01) |
| *H04R 25/00* | (2006.01) |
| *H04L 12/18* | (2006.01) |

(52) U.S. Cl.
CPC .............. *G10L 15/26* (2013.01); *G10L 21/10* (2013.01); *H04R 25/43* (2013.01); *G10L 2021/065* (2013.01); *H04L 12/1827* (2013.01); *H04R 25/405* (2013.01); *H04R 25/552* (2013.01); *H04R 25/554* (2013.01); *H04R 2225/43* (2013.01); *H04R 2225/55* (2013.01); *H04W 4/06* (2013.01); *H04W 8/186* (2013.01); *H04W 8/20* (2013.01); *H04W 92/16* (2013.01)

(58) Field of Classification Search
CPC ........ H04R 1/323; H04R 1/345; H04R 1/403; H04R 2225/41; H04R 2225/43; H04R 2225/61; H04R 25/00; H04R 25/70; H04R 2225/55; H04R 25/554; H04W 4/00
USPC ................................................. 381/312–331
See application file for complete search history.

(56) References Cited

U.S. PATENT DOCUMENTS

| | | | |
|---|---|---|---|
| 5,966,639 A | 10/1999 | Goldberg et al. | |
| 7,676,372 B1* | 3/2010 | Oba | 704/271 |
| 7,949,536 B2* | 5/2011 | Mowatt et al. | 704/275 |
| 8,024,006 B2* | 9/2011 | Yabuta | H04M 1/72522 455/132 |
| 8,155,359 B2 | 4/2012 | Beck | |
| 8,280,434 B2 | 10/2012 | Garg | |
| 8,369,549 B2* | 2/2013 | Bartkowiak et al. | 381/312 |
| 8,718,303 B2* | 5/2014 | Rank et al. | 381/315 |
| 8,885,857 B2* | 11/2014 | Rank et al. | 381/315 |

(Continued)

FOREIGN PATENT DOCUMENTS

EP 1638367 A2 * 3/2006

OTHER PUBLICATIONS

EP 1638367 A2.*

*Primary Examiner* — Richard Zhu
(74) *Attorney, Agent, or Firm* — Schwegman Lundberg & Woessner, P.A.

(57) ABSTRACT

Methods and devices are described for allowing users to use portable computer devices such as smart phones to share microphone signals and/or closed captioning text generated by speech recognition processing of the microphone signals. Under user direction, the portable devices exchange messages to form a signal sharing group to facilitate their conversation.

24 Claims, 3 Drawing Sheets

(56) References Cited

U.S. PATENT DOCUMENTS

| | | | |
|---|---|---|---|
| 2002/0012438 A1* | 1/2002 | Leysieffer | A61N 1/36032 381/312 |
| 2004/0013280 A1* | 1/2004 | Niederdrank | H04R 25/453 381/315 |
| 2006/0067550 A1* | 3/2006 | Puder et al. | 381/315 |
| 2007/0230711 A1* | 10/2007 | Hasler et al. | 381/58 |
| 2008/0207129 A1* | 8/2008 | Page et al. | 455/41.3 |
| 2009/0076804 A1 | 3/2009 | Bradford et al. | |
| 2012/0078628 A1* | 3/2012 | Ghulman | 704/235 |
| 2013/0044128 A1* | 2/2013 | Liu et al. | 345/633 |
| 2013/0044130 A1* | 2/2013 | Geisner et al. | 345/633 |
| 2013/0046533 A1 | 2/2013 | Nyquist et al. | |
| 2013/0329183 A1* | 12/2013 | Blum et al. | 351/158 |

* cited by examiner

METHODS AND APPARATUS FOR SIGNAL SHARING TO IMPROVE SPEECH UNDERSTANDING

TECHNICAL FIELD

This application relates generally methods and apparatus for better understanding of speech using hearing assistance devices.

BACKGROUND

Speech recognition technology is becoming increasingly popular in a variety of computerized devices. One use of this technology is to offer real-time closed captioning to individuals with hearing difficulties where speech is captured by a microphone, and then real-time transcription is performed by a computer. In group conversations, however, problems arise in applying speech recognition to members of the group. Unless a speaker is very close to the microphone, the resulting audio signal is likely to be of poor quality which causes the speech recognition to be correspondingly poor.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Signal Sharing for Group Conversations

The systems and methods described below allow users to share the microphone signals of wireless devices that they own (e.g., hearing aids, smart phones, advanced remotes, wireless headsets, lapel microphones, etc.) with others and/or share texts corresponding to the audio signals as generated by speech recognition processing, referred to herein as closed captioning. The embodiments described below are with reference to the following example situation. Suppose that three individual users are seated in a noisy restaurant. Two wear hearing aids with wireless capabilities, and one has normal hearing. All three of them own a smart phone or other portable device with wireless capabilities. Under user direction, the three portable devices exchange messages to form a signal sharing group to facilitate their conversation. The devices in the signal sharing group establish wireless resources over which information-carrying signals may be transmitted and received. The devices then proceed to share signals generated as a result of the conversation between the users in any of the following manners.

Signal Sharing of Microphone Signals

In one embodiment, an application is installed on all the portable devices that allows each device to share its microphone signals with other devices. The two individuals with hearing loss open this application and view a list of microphones in the vicinity (each having its own unique identification name or number that is customizable by the owner of the device). They select the microphone(s) of interest and send the owners of those devices a request to share their microphone signals. Both of the hearing-impaired individuals would receive a signal sharing request from each other, and the normal-hearing individual would receive a signal sharing request from the two individuals with hearing loss. Each individual would accept the sharing request(s). Each individual would receive a message indicating that the others have accepted their sharing request. For the individuals with hearing aids, they could choose to share either the signal(s) that are captured by their hearing-aid microphones, the signal(s) captured from their smart-phone microphones (which are seated on the table in front of them), or allow the application to pick the microphone with the best signal. For a hearing aid wearer, because of the proximity of the hearing-aid microphones to the wearer's mouth, the signal produced by the hearing-aid microphone is likely to be of higher quality and would probably be selected for sharing. The normal-hearing individual could share the signal that is captured by his smart phone. The system thus allows hearing-impaired individuals to have multiple conversation partners at once without requiring the hearing-impaired person to pass a microphone from person to person.

In order to share microphone signals, the portable devices agree on wireless resources (i.e., time-frequency resources) over which the audio signals are to be transmitted using a particular modulation scheme (e.g., orthogonal frequency multiplexing). In one embodiment, each portable device relays the audio signal received from its own microphone to other devices in the signal sharing group. In another embodiment, a portable device may establish direct wireless communication channels between one of its wireless microphones and one or more other devices in the signal sharing group.

In one embodiment, the audio signals from one portable device are transmitted to a recipient device which then performs speech recognition processing to generate closed captioning text for display to its user. This means that each of the two hearing-impaired individuals' devices could potentially perform closed captioning on two signals: each other's hearing-aid microphone signal and the normal-hearing individual's smart phone signal. Alternatively, for a particular speech segment, a portable device could decide to perform speech recognition processing on only one audio signal (e.g., selected according to signal quality) or not perform such processing at all. In addition to, or instead of, performing speech recognition processing on a received audio signal, the portable device could transmit the received audio directly to its user. For example, a recipient device belonging to a hearing aid wearer could wirelessly transmit an audio signal received from another user's microphone to the hearing aid of the wearer. In that case, the portable device could also be programmed to perform signal processing especially adapted to compensate for the hearing aid wearer's hearing deficit (e.g., frequency specific amplification, compression, etc.).

In aspects of other embodiments, the owners of the microphones could have complete control over who has access to their microphone signals so that they would be able to turn on/off signal sharing at any time. This could be performed manually, or preferences could be set-up such that microphone sharing would only occur during certain time periods and/or when the microphones and the portable devices were within a certain geographic range of each other (as determined by Global Positioning Systems (GPS) or other localization technologies in the portable devices/hearing aids). In the currently described example, the three owners of the devices may elect to share their microphone signals for 2 hours as long at the microphones are within 10 feet of the others' portable devices. Adding such specific "shut-off" criteria would decrease the likelihood that someone would send an undesired message to another person, for example, if one of the individuals left the conversation to use the bathroom.

Signal Sharing of Closed-Captioning

In another embodiment, the signal sharing would be implemented by having each individual's portable device perform closed captioning on that device's audio signal and then send the results to the other devices for viewing. In this case, the signal from the hearing aid microphones would be sent wirelessly to the portable device, the portable device would perform the closed captioning, and then the results would be sent to the other devices for viewing. For the individual without hearing aids, closed captioning would be performed on the signal that was captured by the smart phone's microphone, and then the results would be sent to the other devices for viewing. This approach would minimize the processing demands on the portable devices of the hearing-impaired individuals, because they would both need to perform closed captioning on only one signal, the signal that was captured by their own device's microphone. It would also reduce redundancy in that both of the hearing-impaired individuals' devices would not need to individually perform closed captioning on the normal-hearing individual's microphone signal. Additionally, having each individual's device perform closed captioning on its own microphone signal would have the advantage that that device may be more familiar with the owner's voice, perhaps having gone through a training period with the application, and therefore the closed captioning may be more accurate than if it were processed by another's device. Finally, this option would allow the normal-hearing person the option of viewing his own closed captioning log so that he could correct (e.g., verbally or by retransmission of the text) any errors that he observed.

In another aspect of certain embodiments, the portable device of a user may compare the closed captioning results received from all of the sources, come to a conclusion as to what was actually said (e.g., fill in gaps when necessary) and display the results. For example, assume that the normal-hearing person in the above example is speaking. The microphones of all three devices could pick up this signal and perform closed captioning on it. It may be considered undesirable for each user to see this message displayed three times on his portable device. To avoid this, the device could compare the results of the closed captioning from the three microphone signals, conclude that they were all a part of the same utterance (perhaps basing this decision on a time stamp or based on acoustic properties of the sound sample), compare the closed captioning results to check for differences in and/or gaps in the translation, come to a conclusion regarding what was said (perhaps giving priority to the owner's device because it is more familiar with that individual's voice, to the device that had the best SNR (signal-to-noise ratio), to the word that was translated most frequently (e.g. if ⅔ devices translated one word and one of the devices translated a different word) or based on grammar rules (i.e. which word(s) would make the phase grammatically correct)) and display those results. If text were unique across the different signal sources, it could be displayed separately on the recipient's device next to each microphone's user identification code or ID.

For example, when closed captioning is performed on a portable device before it is sent to the recipient's portable device, additional information could be sent with the closed captioning results that will help the recipient's device "weight" the accuracy of that device's closed-captioning abilities (e.g. information about the environmental level, an estimate of the SNR, whether the sound was spoken by the owner of the device, whether the owner of the device has performed any training with the device to improve the accuracy of its speech recognition abilities, etc.). The recipient's portable device may use this information to decide which message to display, in the event that multiple devices report different closed-captioning results.

In another aspect of certain embodiments, If the sharing recipient temporarily changes conversation partners during a signal-sharing session, the portable device may be programmed so that he may choose to temporarily disable the viewing of the closed captioning results of the other individuals without having to stop the signal-sharing request and then re-submit another request once he resumes conversation with those individuals. Having this capability may be especially useful in larger groups in which a group conversation transitions to side conversations (or vice versa).

Other Variations

Device users may transmit a request that others share their microphone signals and/or CC text signals with them. Those who receive the requests may grant or deny access to these signals. If access is granted, logic may be implemented by the granting device so that the access is only available during a specified period of time or when the portable devices are within a certain geographical range of each other. The owner of each microphone may change the sharing status at any time. To speed up the microphone signal and/or CC text signal sharing process for future encounters, the hearing-impaired wearer's device could store a list of devices whose signals have been shared in the past. The text that was captured during those closed captioning sessions could also be saved for future reference. Additionally, defaults could be set-up for re-occurring meetings by always allowing microphone sharing with a specified device at certain times and/or as long as the microphones/portable devices are within a specified distance of each other. As an added measure of security, device users could be given the option to not display their microphone signals automatically to others that are within range. Signal sharing may be performed in a more secure manner by, for example, exchanging a special code that is associated with the individual's device(s)).

Once microphone signals are set-up for automatic sharing, it would not be necessary for that individual's portable device to be available in order for his microphone signal to be shared (assuming that his microphone signal is not on the portable device). As an example of this, suppose there are two hearing-aid wearers—user A and user B. Both individuals adjust the settings on their portable device. With the default settings, the audio signals from the hearing aids are sent to the owners' portable devices where closed captioning occurs. Each owner's results are then sent to the other's portable device for viewing. That is, microphone signal sharing is implemented. However, if the battery on user A's portable device dies (or if for some other reason that user's portable device is not available), the signal from user A's hearing-aid microphone(s) would now be transmitted automatically (wirelessly) to user B's portable device. In this case, user B's portable device would perform the closed captioning on user A's audio signal. That is, microphone signal sharing is implemented as a back-up configuration.

A portable device may be further configured to store a list of previously shared microphone signals and/or previously shared CC text signals with the ability to create auto-connect settings so that other portable device users do not have to re-initiate signal sharing every time they come into contact. The auto-connect settings may be further configured so that the user has the ability to specify when (e.g. day/time/duration) signal sharing should automatically occur, and/or the ability to specify that the distances within which signal sharing should automatically occur. The portable device may be further configured the ability of the user to temporarily suspend a conversation without requiring the end user to resubmit a signal-sharing request and/or the option not to display one's device information automatically to the general public.

In one embodiment, if multiple microphone signals are available, the portable device is configured to allow its user (or the sharing recipient) to choose which microphone signal should be used for the closed captioning and/or microphone signal sharing. Among the options may be an "auto" option that allows the portable device to select the microphone with the best signal (or combine information from across multiple microphone signals) based on an analysis that is performed on the available signals. For example, in choosing between the signal from the right/left hearing aid or the portable device, logic may be used to determine which hearing aid has the best signal, and closed captioning and/or microphone signal sharing could be performed on that signal. This signal optimization method could be one of the options that is available to the device users, or the system could be configured to perform in this manner automatically when multiple microphone signals are detected. With this method, determining which microphone has the best signal could be done once (i.e., at the beginning of a signal-sharing session), or this analysis could be performed continuously (e.g., every X seconds) during the signal-sharing session. Alternatively, the portable device may be configured to combine information from multiple audio signals that are associated with that device (e.g., both hearing aid signals and the signal from the portable device) and perform closed captioning on all, or parts of, each signal, to come to a conclusion as to what was said. These closed captioning results would then be sent to the sharing recipient's portable device, where additional analysis may be performed to determine the actual speech that was said, before displaying the results on the sharing recipient's screen. In another example, all three signals could be sent to the sharing recipient's device for analysis (i.e., both of the signals from the hearing-aid microphones and the signal from the microphone of the portable device).

In one embodiment, the portable device is configured to analyze the text that is received from multiple devices to check for redundancies and to display only one selected text to its user. In another embodiment, the texts received from multiple sources that correspond to a particular speech segment may be combined by the portable device to generate a composite CC for display using the redundancies found in the multiple received texts. The same process could be performed after the portable device converts one or more received audio signals to text. For example, the portable device may be configured to cross-check the closed captioning results that are received from multiple devices and to correct the signal using logic (e.g., if ⅔ devices translated one word and one of the devices translated a different word, the former would be selected for display) or based on grammar rules (e.g., word(s) would be selected to make the phase grammatically correct) and display those results. In another embodiment, portable devices in the signal sharing group may be configured to send auxiliary information in addition to the closed captioning results to the other portable devices that will help those latter devices weight the accuracy of the sending device's closed-captioning abilities. The auxiliary information may then be used to decide which message to display in the event that multiple devices report different closed captioning results. Examples of such auxiliary information would include information about the environmental level, an estimate of the SNR, whether the speech was spoken by the owner of the device, and whether the owner of the device has performed any training with the device to improve the accuracy of its speech recognition abilities.

While the above examples have shown how this application could be used for personal use, such a system could be used anywhere there is a microphone available and the owner of that microphone has agreed to share that signal with others who want it translated into text (i.e. it could be used for public announcement systems, in auditoriums, in classrooms, at sporting events, etc.). In this scenario, it is possible that a style of computer other than the usual portable device be used (e.g., a laptop or a desktop computer). For situations in which the audio was meant for general consumption by the public (e.g. announcements made by the conductor of a subway system), the system may automatically accept all signal-sharing requests.

The systems and methods described above could also incorporate language translation into the closed captioning abilities.

Example System Description

The system as described above allows individuals to share signals of wireless portable devices that they own with others in what is referred as a signal sharing group. Owners (i.e., users) of the devices may specify who has access to their microphone signals and the conditions under which that access is granted (e.g., the time period or how close their microphones have to be to another's portable device). In one form of signal sharing, the audio signal may be sent from an owner's portable device to a recipient's portable device, which may then perform closed captioning on, or otherwise process, the received audio signal. In another form of signal sharing, closed captioning of the audio signal may be performed on an owner's portable device with the results then sent to recipient devices. A recipient device may compare the closed captioning results from multiple devices to decide what was said with the results then displayed on that device. A system may combine both types of signal sharing.

Figure 1:
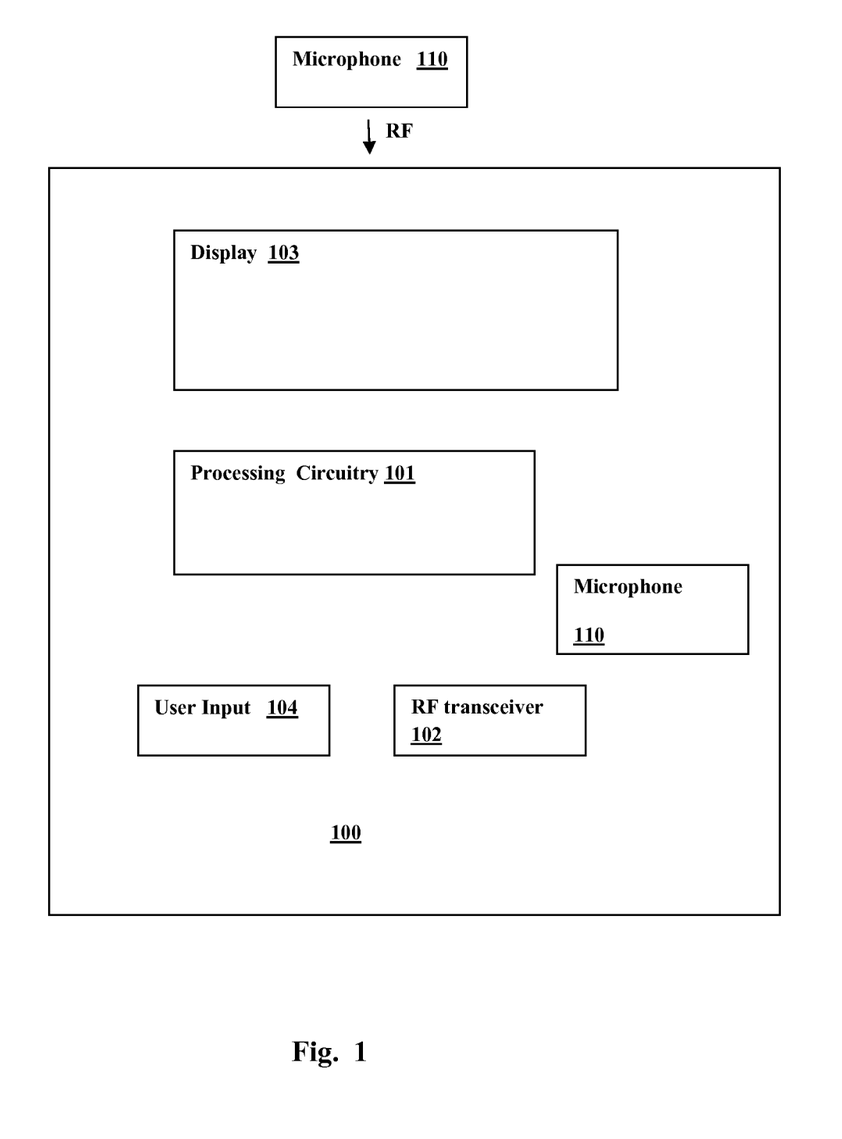
FIG. 1 illustrates basic components of an example portable device.

FIG. 1 illustrates an example according to one embodiment of the basic components of a portable device 100 for use in performing signal-shared closed-captioning. The portable device may be in the form of any type of portable computing device with wireless communication capability such as a smart phone, tablet computer, or laptop computer. The portable device 100 includes processing circuitry 101 (e.g., a processor, memory, and associated circuitry such as additional storage media), a radio-frequency (RF) transceiver 102 interfaced to the processing circuitry, a display 103, and a user input device 104 such as a keyboard or touch-screen keyboard implemented on the display. The device 100 may be configured to perform the various functions as described herein by programming the processing circuitry with software. The RF transceiver 102 may be used to transmit and receive requests to join a signal-sharing group that includes one or more additional such portable devices 100. In accordance with instructions received via the user input device 104, for example, a device 100 transmits a request to another device 100 and, if the request is granted, receives a message from the other device that sets up wireless resources through which audio signals and/or closed-captioning information may be transmitted between the two devices.

Each of the devices 100 in a signal-sharing group may be interfaced to one or more microphones 110, connected directly to the device or connected via wireless channels using the RF transceiver 102. The microphones may be omnidirectional or directional. If the microphones are on hearing aids, they may be located anywhere on the hearing aids, including the faceplates, behind the ear, in the concha or in the canal. For a typical hearing aid wearer, there would be at least two microphones, one for the hearing aid in each ear; more microphones may be available with directional hearing aids. In one embodiment, the portable device may be configured to use one of its microphones as a primary microphone (e.g., the microphone providing the best quality signal or the microphone selected by the user). If a wired connection microphone is selected initially, the portable device may be configured with an automatic back-up streaming option for microphone signals that are not on the portable device but connected wirelessly.

Figure 2:
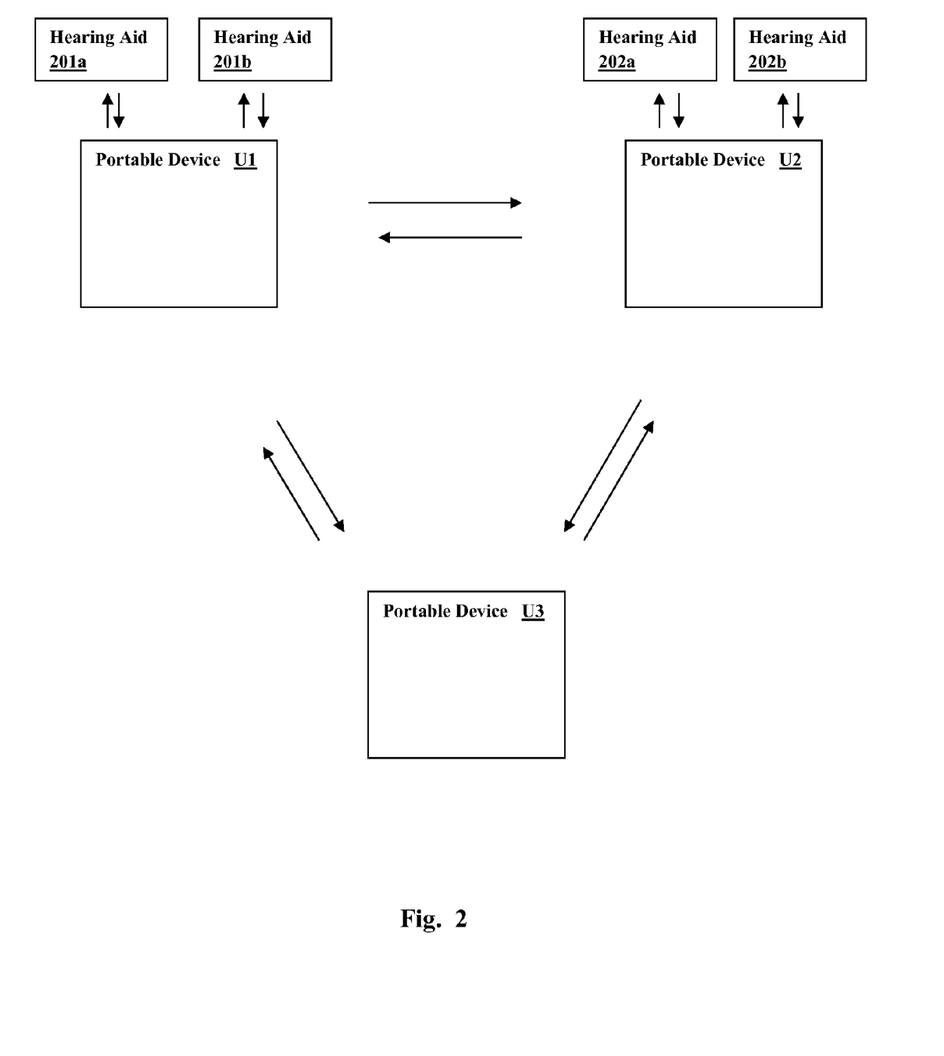
FIG. 2 illustrates an example of a signal sharing group.

FIG. 2 illustrates an example system for performing signal sharing of speech spoken among multiple users each having a portable device such as illustrated in FIG. 1. In this example, a group of portable computing devices designated as U1 through U3 is shown. Each of the portable devices would normally be possessed (or "owned") by a different user. During a conversation between the users, each of the portable devices may provide a visual display of the text of the speech as generated by speech recognition processing to its user, referred to herein as closed-captioning or CC. The display of the CC may be accompanied by an indication as to which user is speaking at any particular point in time. For any particular speech segment (i.e., the speech spoken during a particular time interval by a particular user), the speech recognition processing is performed by one or more of the portable devices, where each of the portable devices may receive audio signals generated by multiple microphones via wireless or wired connections. In the example shown in FIG. 2, the users of devices U1 and U2 are hearing aid wearers, and the devices U1 and U2 are wirelessly connected to hearing aid pairs 201a-b and 202a-b, respectively. The audio signals generated by the microphones each of the hearing aids may be transmitted wirelessly to each of the portable devices U1 through U3 if signal sharing of microphone signals is implemented. Each of the devices U1 through U3 may also receive audio signals generated by other microphones such as a microphone internal to the portable device or an external microphone wirelessly or otherwise connected to the portable device. When a particular user speaks, a portable device may perform speech recognition processing on the received audio signal to generate closed-captioning for the speech. In various embodiments, each portable device may generate closed-captioning for all received audio signals that it receives, may generate closed-captioning only for audio signals received from one or more particular sources (e.g., as determined by user selection) or may generated closed-captioning only for audio signals that meet specified criteria (e.g., exceeding a specified level and/or signal-to-noise ratio). When a portable device generates a CC, the CC is transmitted to the other portable devices in the group. Upon receiving a CC from another portable device, the portable device may compare the received CC with other CCs either generated by itself from a received audio signal and/or received from other portable devices. Based upon specified criteria, the portable device selects a CC to represent the particular speech segment and displays that CC to its user. In one example, CCs are transmitted by a portable device to other portable devices along with a quality indicator based upon criteria such as the level or signal-to-noise ratio of the audio signal used to generate the CC. In selecting among multiple CCs for display, a portable device may also compare the texts for consistency and may give more weight to those CCs generated from a higher quality audio signal.

Figure 3:
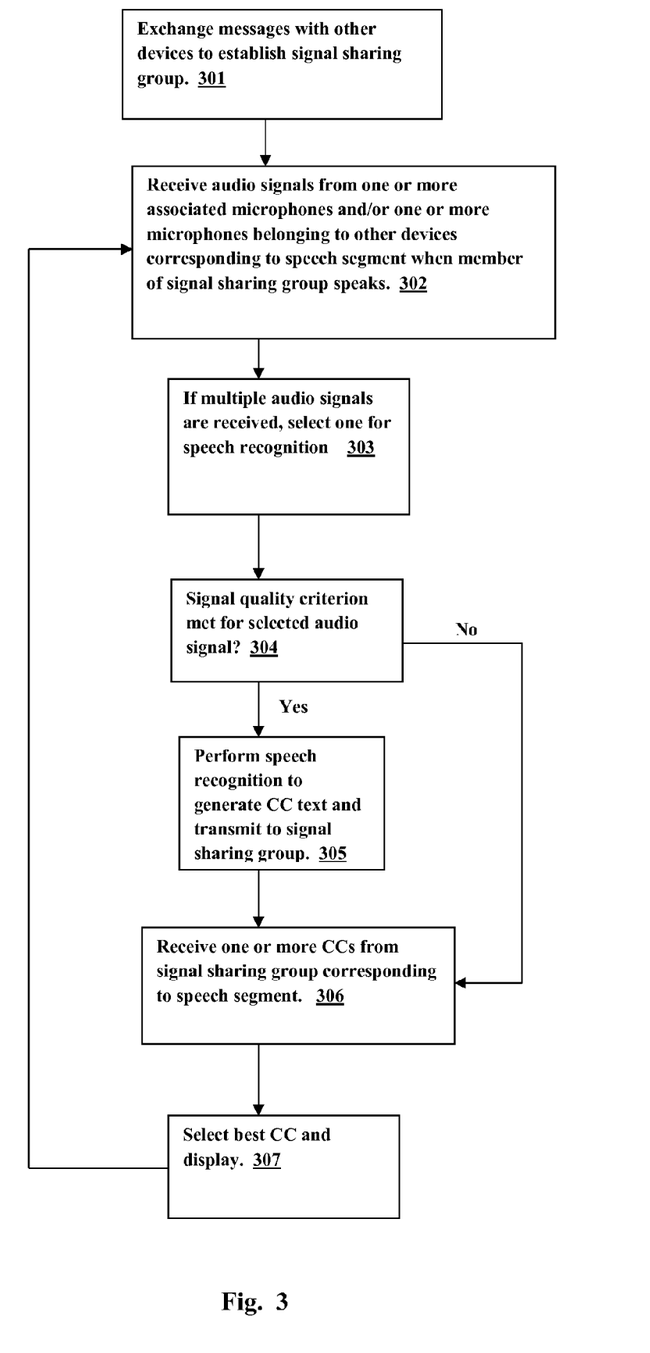
FIG. 3 illustrates an example algorithm executed by a portable device in implementing signal sharing.

FIG. 3 illustrates an example algorithm executed by a portable device in implementing signal sharing. At stage 301, the portable device exchanges messages with other devices to establish a signal sharing group. At stage 302, the device receives audio signals from one or more associated microphones when a user of a device, belonging to the signal sharing group, speaks. If microphone signal sharing is implemented, the device may also receive audio signals from one or more microphones belonging to other devices. At stage 303, if multiple audio signals are received, the device selects one for speech recognition processing. The device tests if the selected audio signal is adequate for performing speech recognition at stage 304. If the audio signal is adequate, the device performs speech recognition processing to generate CC text and transmits the CC to the signal sharing group at stage 305. The device also receives one or more CCs corresponding to the speech segment from devices belonging to the signal sharing group at stage 306. At stage 307, the device selects the best CC and displays it to the user.

It is understood that the hearing aids referenced in this patent application include processing circuitry. The processing circuitry may be a digital signal processor (DSP), microprocessor, microcontroller, or other digital logic. The processing of signals referenced in this application can be performed using the processing circuitry. Processing may be done in the digital domain, the analog domain, or combinations thereof. Processing may be done using subband processing techniques. Processing may be done with frequency domain or time domain approaches. For simplicity, in some examples blocks used to perform frequency synthesis, frequency analysis, analog-to-digital conversion, amplification, and certain types of filtering and processing may be omitted for brevity. In various embodiments the processor is adapted to perform instructions stored in memory which may or may not be explicitly shown. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, realizations of the block diagrams, circuits, and processes set forth herein may occur without departing from the scope of the present subject matter.

The present subject matter can be used for a variety of hearing assistance devices, including but not limited to, cochlear implant type hearing devices, hearing aids, such as behind-the-ear (BTE), in-the-ear (ITE), in-the-canal (ITC), completely-in-the-canal (CIC), or invisible-in-the-canal (IIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. Such devices are also known as receiver-in-the-canal (RIC) or receiver-in-the-ear (RITE) hearing instruments. It is understood that other hearing assistance devices not expressly stated herein may fall within the scope of the present subject matter.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A portable computing device for operation by a user, comprising:
    processing circuitry for executing programmed instructions with a display and user input interfaced thereto;
    a radio-frequency transceiver interfaced to the processing circuitry, wherein the processing circuitry is configured to transmit and receive information-carrying signals to and from other portable devices;
    wherein the processing circuitry is configured to receive audio signals from one or more microphones associated with the device, referred to as associated microphones, via wired or wireless connections, including a hearing aid microphone of the user;
    wherein the processing circuitry is programmed to operate in a signal sharing mode in a signal sharing group made up of one or more other devices also operating in the signal sharing mode;
    wherein the processing circuitry is further programmed to:
    enter the signal sharing mode when access is granted to another device in response to a request to join a signal sharing group received from that device or when a signal sharing request is transmitted to another device and an access grant is received from that device;
    receive one or more audio signals from an associated microphone or another device of the signal sharing group, select a received audio signal and perform speech recognition processing on the selected audio signal to generate closed-captioning text corresponding thereto, and transmit the closed-captioning text to the other devices of the signal sharing group;
    receive closed-captioning texts from other devices of the signal sharing group;
    display generated and received closed-captioning texts; and,
    enable the user to temporarily disable viewing of the closed captioning texts from devices in the signal sharing group without stopping the signal sharing mode when the user converses with an individual outside of the signal sharing group.

2. The device of claim 1 wherein the processing circuitry is further programmed in the signal sharing mode to transmit the audio signal from an associated microphone to other devices of the signal sharing group.

3. The device of claim 2 wherein the processing circuitry is further programmed in the signal sharing mode to allow the user to choose via the user input which of the associated microphone signals should be used for transmitting to other devices of the signal sharing group.

4. The device of claim 2 wherein the processing circuitry is further programmed in the signal sharing mode to analyze the quality of the associated microphone signals and select the microphone signal that is to be used for transmitting to other devices of the signal sharing group based upon signal quality.

5. The device of claim 1 wherein the processing circuitry is further programmed in the signal sharing mode to display closed-captioning text along with an indication as to the source of the audio signal from which the text was generated.

6. The device of claim 1 wherein the processing circuitry is further programmed in the signal sharing mode to perform speech recognition processing only for received audio signals that meet a specified quality criterion.

7. The device of claim 1 wherein the processing circuitry is further programmed in the signal sharing mode to compare multiple closed captioning texts either generated by itself or received from other devices that correspond to a single speech segment and to select a single closed captioning text for display.

8. The device of claim 7 wherein the selection of a single closed captioning text for display is based upon grammatical rules.

9. The device of claim 7 wherein the selection of a single closed captioning text for display is based upon which microphone signal from which the closed captioning text was derived had the best signal-to-noise ratio.

10. The device of claim 7 wherein the selection of a single closed captioning text for display is based upon words or phrases that occur most frequently in the multiple closed captioning texts.

11. The device of claim 7 wherein the selection of a single closed captioning text for display is based upon a comparison of the sources of the closed captioning texts giving preferential weight to a closed captioning text generated by a device when the text is generated from speech spoken by the user of that device.

12. The device of claim 1 wherein the processing circuitry is further programmed in the signal sharing mode to compare closed captioning texts either generated by itself or received from other devices that correspond to a single speech segment and to derive a composite closed captioning text for display.

13. The device of claim 12 wherein the processing circuitry is further programmed in the signal sharing mode to, when deriving a composite closed captioning text, give preferential weight to a closed captioning text generated by a device when the text is generated from speech spoken by the user of that device.

14. The device of claim 12 wherein the derivation of a composite closed captioning text for display is based upon grammatical rules.

15. The device of claim 12 wherein the derivation of a composite closed captioning text for display is based upon is based upon the signal-to noise ratios of the microphone signals from which the closed captioning texts were derived.

16. The device of claim 12 wherein the derivation of a composite closed captioning text for display is based upon words or phrases that occur most frequently in the multiple closed captioning texts.

17. The device of claim 1 wherein the processing circuitry is further programmed in the signal sharing mode to transmit along with the closed captioning text an estimate of the level of the audio signal and/or an estimate of the signal-to-noise ratio of the audio signal from which the closed captioning text was generated.

18. The device of claim 1 wherein the processing circuitry is further programmed in the signal sharing mode to transmit along with the closed captioning text an indication as to whether the speech represented by the closed captioning text was spoken by the user of the device.

19. The device of claim 1 wherein the processing circuitry is further programmed in the signal sharing mode to transmit along with the closed captioning text an indication as to whether the user of the device has performed any training with the device to improve the accuracy of speech recognition processing.

20. The device of claim 1 wherein the processing circuitry is further programmed in the signal sharing mode to allow the user to choose via the user input which of the associated microphone signals is to be used for generating closed captioning texts.

21. The device of claim 1 wherein the processing circuitry is further programmed in the signal sharing mode to analyze the quality of the associated microphone signals and select the microphone signal that is to be used for generating closed captioning texts based upon signal quality.

22. The device of claim 1 wherein the processing circuitry is further programmed to store a list of devices whose signals have been shared in the past and automatically grant access to those devices when a signal sharing request is received.

23. The device of claim 22 wherein the processing circuitry is further programmed to store a list of devices whose signals have been shared in the past and automatically grant access to those devices when a signal sharing request is received only during specified times.

24. The device of claim 22 wherein the processing circuitry is further programmed to store a list of devices whose signals have been shared in the past and automatically grant access to those devices when a signal sharing request is received only if the device is within a specified distance from the device requesting signal sharing.

* * * * *